Patented June 6, 1939

2,161,754

UNITED STATES PATENT OFFICE 2,161,754

VULCANIZATION OF RUBBER

George W. Watt, Akron, Ohio, assignor to Wingfoot Corporation, Wilmington, Del., a corporation of Delaware No Drawing. Application May 15, 1937,
Serial No. 142,879

10 Claims. (Cl. 18—53)

This invention relates to the vulcanization of rubber and more particularly it relates to the vulcanization of rubber in the presence of a new class of accelerators which are the addition products of guanidines and isothiocyanates. Many of these materials are new compounds.

Numerous accelerators of the vulcanization of rubber are known, these vary greatly in their characteristics. Some are preferably used by themselves while others are preferably used in conjunction with activators or retarders. The present invention embraces a new class of accelerators, the members of which, it has been found, are particularly suited for use as activators in conjunction with other accelerators although, in some cases they may be used by themselves.

The compounds of the invention may be structurally represented by the formula

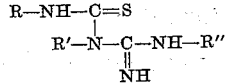

in which R is an aliphatic or aromatic substituent and R' and R'' are aromatic radicals. These compounds are addition products of guanidines and isothiocyanates similar to the N-phenyl aminothiocarbonyl-N, N'-diphenyl guanidine prepared by Rathke (Ber. 12, 774 (1879)) in accordance with the equation

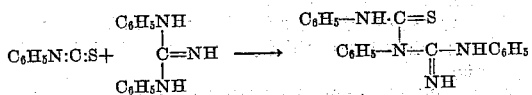

from phenyl mustard oil (phenyl isothiocyanate) and sym-diphenylguanidine.

The following examples may be taken to illustrate the preparation of the compounds of the invention:

Example 1

Twenty-five parts of sym-diphenylguanidine and 16 parts of phenyl mustard oil were allowed to stand at room temperature in 100 parts of benzene for six days. Several times each day the reaction mixture was agitated so as to assure completion of the reaction. The insoluble crystals were then filtered off and washed with benzene. This product consisted of 36.5 parts (89% yield) of N,-phenylaminothiocarbonyl-N, N'-diphenylguanidine, in the form of grayish white crystals melting at 161-2°. Recrystallization from alcohol gave white crystals which melted at 163° C.

Analysis

Calculated for $C_{20}H_{18}N_4S$: N, 16.2; S, 9.3
Found: N, 15.9; S, 9.6.

Hence the formula is assumed to be:

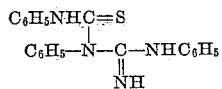

Example 2

N-o-tolylaminothiocarbonyl - N,N' - diphenylguanidine was prepared as follows: 21.1 parts of sym-diphenylguanidine and 14.9 parts of o-tolyl mustard oil were permitted to stand at room temperature in 100 parts of benzene for seven days. The white crystalline product was filtered off and washed with cold benzene. Twenty and five-tenths parts of product were isolated. The mother liquor was allowed to evaporate, whereupon an additional 7.0 parts of the product were obtained. The total yield was 27.5 parts or 76% of the theoretical. The product melted at 116–117° C. and when recrystallized from alcohol melted sharply at 116°.

Analysis

Calculated for $C_{21}H_{20}N_4S$: N, 15.6; S, 8.9.
Found: N, 15.4; S, 9.1.

The formula is therefore assumed to be:

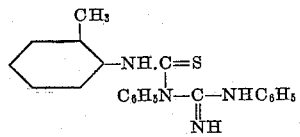

Example 3

N-allylaminothiocarbonyl-N,N'-diphenylguanidine was prepared in the following manner: 21.1 parts of sym-diphenylguanidine and 9.8 parts of allyl mustard oil were permitted to stand in 100 parts of benzene at room temperature for seven days with frequent agitation. The white crystalline product was filtered off and the mother liquor allowed to evaporate at room temperature, whereby additional crops of the desired product separated from the solution and were isolated by filtration. Eleven parts (36% yield) of the product melting at 131–134° C. were obtained. The formula of this compound is assumed to be:

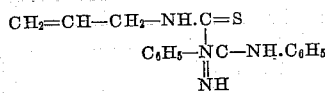

EXAMPLE 4

N-phenylaminothiocarbonyl-N,N'-di-o-tolylguanidine was prepared as follows: 23.9 parts of di-o-tolylguanidine and 13.5 parts of phenyl mustard oil were allowed to react in 100 parts of benzene at room temperature for three days. The grayish-white crystals were filtered off, and washed with benzene. The yield was 36.5 parts or 98% of the theoretical. The product melted at 168–169° C. After recrystallization from alcohol, the product consisted of white crystals melting at 176° C.

Analysis

Calculated for $C_{22}H_{22}N_4S$: N, 15.0; S, 8.6. Found: N, 15.4; S, 8.8

Hence the formula may be assumed to be

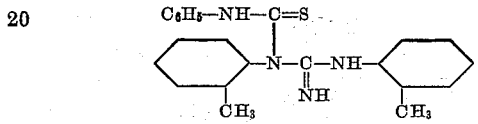

EXAMPLE 5

Eighteen parts of di-p-tolylguanidine and 10.2 parts of phenyl mustard oil were allowed to stand in 75 parts of benzene at room temperature for six days. The insoluble crystals were filtered off and washed with a little cold benzene. Upon standing at room temperature, further crops of the desired product were obtained. The yield was 23 parts or 82% of the theoretical. The material melted at 136–138° C. The formula for this product, N-phenylaminothiocarbonyl-N, N'-di-p-tolylguanidine, is assumed to be:

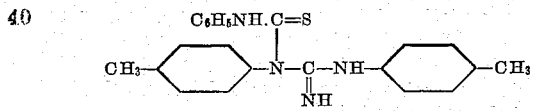

The products obtained in the foregoing examples are of a relatively high degree of purity. However, they may be further purified, if desired, by recrystallization from a suitable organic solvent such as alcohol, or by precipitation from acetone or chloroform by addition of petroleum ether.

Other isothiocyanates or mustard oils may be substituted for those in the foregoing examples, among them being ethyl isothiocyanate, propyl isothiocyanate, isopropyl isothiocyanate, n-butyl isothiocyanate, isobutyl isothiocyanate, tertiary butyl isothiocyanate, n-hexyl isothiocyanate, n-heptyl isothiocyanate, secondary octyl isothiocyanate, diphenyl isothiocyanate, paratolyl isothiocyanate, etc. Also, any other symmetrical diaryl guanidine may be employed.

While the materials of the invention may be utilized in numerous rubber compounding formulae the following is one in which they have been found to yield outstanding results.

| | Parts by weight |
|---|---|
| Smoked sheet | 100 |
| Zinc oxide | 5 |
| Sulfur | 3 |
| 2-mercaptobenzothiazole | .3 |
| Activator as shown. | |

Samples were incorporated into rubber in accordance with this formula. Pieces were cured and tested to give the following results:

| Compound (as activator) | Name |
|---|---|
| A | N-phenylaminothiocarbonyl-N, N'-diphenylguanidine. |
| B | N-phenylaminothiocarbonyl-N, N'-di-o-tolylguanidine. |
| C | N-o-tolylaminothiocarbonyl-N, N'-diphenylguanidine. |
| D | N-phenylaminothiocarbonyl-N, N'-di-p-tolylguanidine. |
| E | N-allylaminothiocarbonyl-N, N'-diphenylguanidine. |

The testing data obtained was as follows:

| Comp. | Amount | Cure, min. at F. | Tensile strength, kg/cm.² | Ultimate elong. | Modulus 500% | Modulus 700% |
|---|---|---|---|---|---|---|
| A | 0.20 | 20/260 | 138 | 810 | 20 | 71 |
| A | 0.10 | 20/260 | 120 | 820 | 18 | 60 |
| B | 0.10 | 20/260 | 136 | 810 | 20 | 72 |
| C | 0.10 | 40/260 | 154 | 780 | 25 | 95 |
| D | 0.10 | 20/260 | 118 | 760 | 23 | 83 |
| E | 0.10 | 20/260 | 124 | 784 | 22 | 76 |

These data demonstrate the useful characteristics of the compounds, particularly when they are utilized as activators. The examples cited are, however, merely representative. The compounds may be employed in other formulae as activators in conjunction with various accelerators or by themselves as the primary accelerator.

Although only the preferred form of the invention has been described in detail it will be apparent to those skilled in the art that various modifications may be made therein without departing from the spirit of the invention or the scope of the appended claims in which it is intended to cover all features of patentable novelty residing in the invention.

I claim:

1. The method of treating rubber which comprises vulcanizing the same in the presence of the addition product of a symmetrical diaryl guanidine and an alkyl isothiocyanate.

2. The method of treating rubber which comprises vulcanizing the same in the presence of the addition product of a symmetrical diaryl guanidine and an aryl isothiocyanate.

3. A rubber product which has been vulcanized in the presence of the addition product of a symmetrical diaryl guanidine and an alkyl isothiocyanate.

4. A rubber product which has been vulcanized in the presence of the addition product of a symmetrical diaryl guanidine and an aryl isothiocyanate.

5. The method of treating rubber which comprises vulcanizing the same in the presence of a compound having the formula

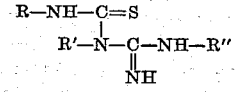

in which R' and R" are aryl and R is selected from the group consisting of alkyl and aryl radicals.

6. The method of treating rubber which comprises vulcanizing the same in the presence of the addition product of symmetrical diphenylguanidine and an alkyl isothiocyanate.

7. The method of treating rubber which comprises vulcanizing the same in the presence of the addition product of symmetrical diphenylguanidine and an aryl isothiocyanate.

8. A rubber product which has been vulcanized in the presence of a compound having the formula $$\begin{array}{c} R-NH-C=S \\ | \\ R'-N-C-NH-R'' \\ \| \\ NH \end{array}$$

in which R' and R'' are aryl and R is selected from the group consisting of alkyl and aryl radicals.

9. A rubber product which has been vulcanized in the presence of the addition product of symmetrical diphenylguanidine and an alkyl isothiocyanate.

10. A rubber product which has been vulcanized in the presence of the addition product of symmetrical diphenylguanidine and an aryl isothiocyanate.

GEORGE W. WATT.